United States Patent [19]

Kaiser, Jr.

[11] Patent Number: 4,891,252
[45] Date of Patent: * Jan. 2, 1990

[54] THERMOMETER HOOD ORNAMENT

[76] Inventor: Elmar Kaiser, Jr., 6 Route de Meyrin - CH 1202, Geneva, Switzerland

[*] Notice: The portion of the term of this patent subsequent to Nov. 8, 2005 has been disclaimed.

[21] Appl. No.: 224,330

[22] Filed: Jul. 26, 1988

Related U.S. Application Data

[63] Continuation-in-part of Ser. No. 100,898, Sep. 25, 1987, Pat. No. 4,783,352.

[30] Foreign Application Priority Data

Oct. 6, 1987 [WO] World Int. Prop. O. .... DM/009416

[51] Int. Cl.$^4$ .............................................. B60R 13/04
[52] U.S. Cl. ................................... 428/31; D12/198; 40/591; 374/208
[58] Field of Search ............................ 362/79; 428/31; D12/197, 198; 374/146, 208; D10/57; 40/591

[56] References Cited

U.S. PATENT DOCUMENTS

| | | | |
|---|---|---|---|
| D.66,778 | 3/1925 | Plein | D12/198 |
| D. 69,873 | 4/1926 | Durland | D12/198 |
| D. 280,807 | 10/1985 | Kaiser | D12/197 |
| 1,946,916 | 2/1934 | Rizzo | 362/79 |
| 2,235,252 | 3/1941 | Bradley | D10/57 X |
| 2,447,382 | 8/1948 | Whittier | 428/325 X |
| 3,968,977 | 7/1976 | Wilfert | 428/31 X |
| 4,416,553 | 11/1983 | Huebscher | 374/165 |
| 4,443,832 | 4/1984 | Kanamori et al. | 362/61 X |
| 4,646,208 | 2/1987 | Hayashi et al. | 40/591 X |
| 4,783,352 | 11/1988 | Kaiser, Jr. | 428/31 |

FOREIGN PATENT DOCUMENTS

| | | | |
|---|---|---|---|
| 672775 | 11/1985 | Japan | 428/31 |
| 831615 | 3/1960 | United Kingdom | 428/31 |

Primary Examiner—Henry F. Epstein
Attorney, Agent, or Firm—Fleit, Jacobson, Cohn, Price, Holman & Stern

[57] ABSTRACT

A thermometer equipped so as to be placed in the field of vision of the driver, on an element of the front part of the body of a vehicle. The thermometer includes a case provided with a display dial, a metallic support surrounding this case and mounted on a ball-and-socket joint, a base made of synthetic material, and a lamp in the base for illuminating the display dial. This base may be glued and/or bolted to the hood at the front of the vehicle. The case can pivot with respect to the support. The thermometer is used to measure and display the temperature outside of an automobile during the daylight or illuminated at night.

23 Claims, 2 Drawing Sheets

THERMOMETER HOOD ORNAMENT

This application s related to U.S. patent application Ser. No. 028,325, filed Mar. 20, 1987, and is a continuation-in-part application of U.S. patent application Ser. No. 100,898, filed Sep. 25, 1987 now Pat. No. 4,783,352 and is related to U.S. patent application Ser. No. 028,325, filed Mar. 20, 1987.

FIELD OF THE INVENTION

This invention relates to a thermometer hood ornament which includes a light for illuminating a temperature dial of the ornament.

BACKGROUND OF THE INVENTION

There are thermometers that show a driver the outside air temperature. They comprise an exterior sensor wired to a dial, which is incorporated into a dash board. However, because such equipment is relatively expensive and consumes space on the dash board, manufacturers install them only on more expensive vehicles, and it is difficult for the user to install one of these types of thermometers after purchase.

One solution to the above-mentioned problem is a thermometer in which the case includes, with respect to the dial, a transparent face surrounded by an adhesive surface, allowing the case to be fastened to the outside surface of the vehicle s windshield. This remedy has serious disadvantages, however. First, the thermometer is influenced by the interior temperature of the vehicle, due to radiation and/or conduction, so that it often gives a false reading. Second, because it would be dangerous to place the thermometer facing the driver, where it would be in the way of his or her view of the road, the thermometer must be placed to the side with respect to the field of vision, and it is thus difficult to read the dial.

SUMMARY OF THE INVENTION

The present invention is a thermometer designed to show the driver of an automobile the outside air temperature during the daylight or illuminated at night, wherein there is a case provided with a measuring device, a temperature dial display, and a fastening device to mount the case onto the outside of the body of the vehicle.

The purpose of the present invention is to furnish a thermometer that overcomes the above-noted disadvantages, by mounting the thermometer on the forward part of the body of the vehicle, appreciably facing the driver, for example, on the front of the hood. A specific goal is to produce this thermometer in the form of an accessory which may be sold separately and, if desired, installed afterward by the purchaser of a vehicle that lacks an outside thermometer.

For this purpose, the invention includes a thermometer of the type referred to above, wherein the fastening means includes a base that has a horizontal or oblique lower surface equipped to be fastened to the body, and wherein the case is mounted on the base in such fashion that the dial is kept erect with respect to the lower surface. This lower surface may include an adhesive coating and a bored hole to receive a bolt for fastening through the material of the car body.

In a preferred embodiment, the case is mounted on a support, and this support is attached to the base by a ball-and-socket friction joint. For example, the support may comprise a substantially spherical pedestal, and the base may comprise a block of synthetic elastic material provided with a housing that opens at the top into which the pedestal of the base is engaged by force.

Preferably, the support comprises a metal frame surrounding the case. The case may be thermally insulated with respect to the support and may notably be separated from the support by a gap that allows passage of the outside air which is traversed by at least two rods supporting the case. The case may be mounted so as to pivot on the support. In order to prevent the influence of solar radiation, the case may be provided with a reflective coating.

BRIEF DESCRIPTION OF THE DRAWINGS

The invention will be best understood with the aid of the following description of an example of its construction, with reference to the attached drawings, in which.

DETAILED DESCRIPTION OF THE PREFERRED EMBODIMENT

Figure 1:
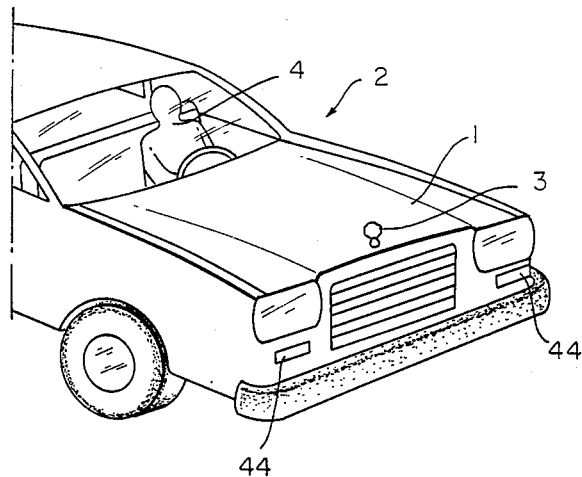
FIG. 1 is a schematic view in perspective showing the placement of a hood ornament on the body of the automobile.

FIG. 1 shows the basic concept, which consists of placing a hood ornament 3 on the forward hood 1 of an automobile 2 to show the outside air temperature to the occupants of the vehicle, notably, the driver 4. In this arrangement, the hood ornament 3 is placed in the normal field of vision of the driver, without hindering his vision of the road. Driver 4 can read the outside temperature without taking his or her eyes from the road. Moreover, the hood ornament 3 may be combined with another functional or decorative element, for example, a streamlined design or an emblem of the vehicle manufacturer.

Figure 2:
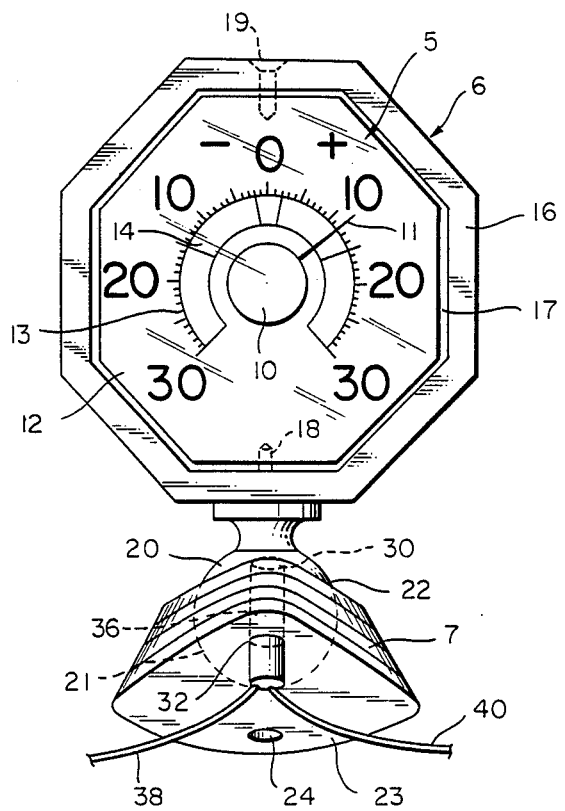
FIG. 2 is an elevated view of the hood ornament.

FIG. 2 shows in more detail a form of construction of hood ornament 3, which essentially comprises a case 5, a support 6, and a base 7. In this embodiment, the case 5 has a flat, octagonal shape and is composed of transparent synthetic material, at least on its front face, as illustrated in the drawing. Preferably, the other surfaces, and particularly the rear surface, are provided with a reflective coating. Case 5 contains temperature measuring and display elements, that is, a bimetallic spiral strip 10 associated with a needle 11 and a circular dial 12 provided with a scale 13. In order to facilitate readability at a distance, the scale has large numbers and colored background fields 14, which correspond to different air temperature zones.

Support 6 is here a metallic element, for example, a casting alloy of aluminum. It includes an octagonal frame 16 surrounding the case 5 to protect the case against possible shock. In addition, a gap 17 is furnished between the frame and case to allow outside air to circulate and to impede transmission of heat between these two elements. To hold case 5 in place, frame 16 is provided with an extending rod 18 in its lower part and, opposite to this rod, a screw 19, the ends of these two elements being engaged in the corresponding holes of the case. Due to this assembly, case 5 can be pivoted with respect to the support, for example, to read the temperature when one is standing in front of the vehicle.

Support 6 is mounted on base 7 by means of a ball-and-socket joint, formed by spherical pedestal 20 of support 6 and a corresponding housing 21 furnished in base 7. In fact, this base is a molded piece of rigid yet elastic synthetic material, such as PVC. The spherical housing 21 presents, at the top, a circular opening 22 the diameter of which is slightly smaller than the diameter of the housing and of pedestal 20. Thus, pedestal 20 of the support may be engaged by force in the housing 21 through the opening 22, due to the elasticity of the material. The support is kept in place by the friction of pedestal 20 inside housing 21. Due to this ball-and-joint socket, support 6 may at any time be placed in a position in which frame 12 is vertically erect, and thus easy to read. Moreover, the ball-and-socket joint allows the support and case to be pushed down to prevent damage in the event of a shock.

In order to be fastened to the forward part of hood 1 of the vehicle, base 7 includes a lower surface 23 which is slightly slanted and which is coated with an adhesive layer, for example, a two-sided adhesive sheet. Furthermore, the base is provided with a bored hole 24 in surface 23, which is intended to accept a fastening bolt that passes through the hood and into the hole 24 to prevent theft of the thermometer. Of course, the thermometer could also be placed on another forward element of the body of the vehicle, for example, on a fender.

Figure 3:
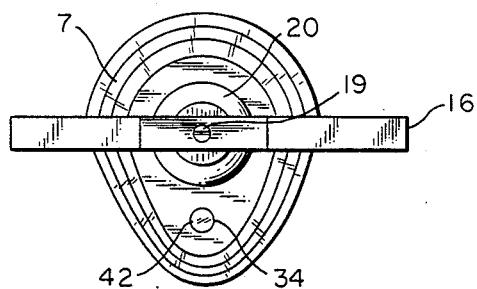
FIG. 3 is a plan view of the hood ornament.

Extending through base 7 is a cylindrical passage 30 having opening 32 at surface 23 and opening 34 at the top surface of the base 7. Extending through the passage 30 is cylindrical lighting housing 36, which extends from the top opening 34 and beyond the bottom opening 32. At the base of the lighting housing 36 project two electrically conducting wires 38 and 40. At the top of the housing 36, as shown in FIG. 3, is a lamp 42. Wires 38 and 40 are connected to the lamp 42 so that when power passes through the wires 38 and 40, the lamp 42 is lit. The lit lamp 42 illuminates the temperature dial of the case 5 for viewing of the outside temperature under darkened conditions. The housing 36 is held in the passage 30 by a friction fit.

Figure 4:
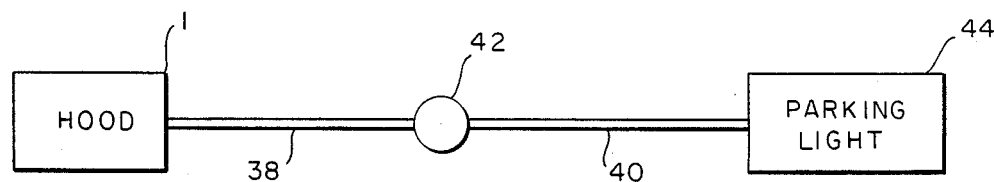
FIG. 4 is a schematic view of the electrical circuitry of the light for the hood ornament.

In FIG. 4, lamp 42 is shown connected to wires 38 and 40. The lamp 42 is a 12-volt, 60mA lamp. The wire 38 is approximately 4 inches long and is connected to the hood 1 of the automobile, which acts as a ground. The wire 40 is approximately 7 feet long and is connected to one of the parking lights 44. When the parking lights 44 are turned on, the electrical connection of the lamp 42 into the parking light circuit will activate the lamp 42 to illuminate the temperature dial of the case.

For a motorcycle, a lamp suitable for connection with a 12-, 6-, or 3-volt electrical system of the motorcycle is used with a 60mA rating.

Since the housing 36 projects beyond the lowermost surface 23 of the base 7, a corresponding hole in the hood 1 of the automobile needs to be made to receive the projected portion of the housing.

Having described the invention, many modifications thereto will become apparent to those skilled in the art to which it pertains without deviation from the spirit of the invention, as defined by the scope of the appended claims.

I claim:

1. A thermometer for showing the driver of an automobile the outside temperature, said thermometer comprising:
    a case including measuring means for measuring air temperature and a temperature dial display,
    a support including a frame surrounding said case and a pedestal located below said frame,
    means for supporting and separating said case from said frame to form a gap for permitting passage of air therebetween and to impede transmission of heat between said frame and said case, said means pivotably mounting said case with respect to said frame for rotation of said case,
    fastening means for fastening said case onto the exterior of a hood of an automobile, said fastening means including a base having a flat lowermost surface equipped to be fastened onto the exterior of the automobile, and said pedestal being movably mounted on said base so that said case is movable to an erect position with respect to said lower surface and for movement to prevent damage in the event of a shock, and
    illumination means for illuminating said case so as to light up said temperature dial.

2. A thermometer as in claim 1, wherein said lower surface of said base includes an adhesive coating and a bored hole to accept a fastening bolt passing through the hood of the body of the automobile.

3. A thermometer as in claim 1, wherein said support is movably mounted on said base by a ball and socket friction joint.

4. A thermometer as in claim 3, wherein said support includes a substantially spherical pedestal, and said base includes a block of elastic synthetic material provided as a housing open at its top, and said pedestal being engaged in said base.

5. A thermometer as in claim 3, wherein said frame surrounding said case is metallic.

6. A thermometer as in claim 1, wherein said gap is spanned by at least two rods forming said means supporting said case on said support.

7. A thermometer as in claim 1, wherein said case includes a reflective coating on a side opposite to that through which said measuring means is viewed to minimize the effects of the sun on said measuring means.

8. A thermometer as in claim 5, wherein said case includes colored background fields corresponding to different temperature zones.

9. A thermometer as in claim 3, wherein said gap is spanned by at least two rods forming said means supporting said case on said support.

10. A thermometer as in claim 1, wherein said illumination means is located in said base.

11. A thermometer as in claim 1, wherein said illumination means is electrically connected to a parking light.

12. A thermometer as in claim 1, wherein said illumination means includes a lamp located in a passage in said base.

13. A thermometer for showing the driver of an automobile the outside temperature, said thermometer comprising:
    a case including measuring means for measuring air temperature and a temperature dial display,
    a support including a frame surrounding said case and a pedestal located below said frame,
    means for supporting and separating said case from said frame to form a gap for permitting passage of air therebetween and to impede transmission of heat between said frame and said case, said means pivotably mounting said case with respect to said frame for rotation of said case, fastening means for fastening said case onto the exterior of a hood of an automobile, said fastening means including a base having a flat lowermost surface equipped to be fastened onto the exterior of the automobile, and said pedestal being movably mounted on said base so that said case is movable to an erect position with respect to said lower surface and for movement to prevent damage in the event of a shock, and illumination means located in said base for illuminating said case from below so as to light up said temperature dial.

14. A thermometer as in claim 13, wherein said lower surface of said base includes an adhesive coating and a bored hole to accept a fastening bolt passing through the hood of the body of the automobile.

15. A thermometer as in claim 13, wherein said support is movably mounted on said base by a ball and socket friction joint.

16. A thermometer as in claim 15, wherein said support includes a substantially spherical pedestal, and said base includes a block of elastic synthetic material provided as a housing open at its top, and said pedestal being engaged in said base.

17. A thermometer as in claim 15, wherein said frame surrounding said case is metallic.

18. A thermometer as in claim 13, wherein said gap is spanned by at least two rods forming said means supporting said case on said support.

19. A thermometer as in claim 13, wherein said case includes a reflective coating on a side opposite to that through which said measuring means is viewed to minimize the effects of the sun on said measuring means.

20. A thermometer as in claim 17, wherein said case includes colored background fields corresponding to different temperature zones.

21. A thermometer as in claim 15, wherein said gap is spanned by at least two rods forming said means supporting said case on said support.

22. A thermometer as in claim 13, wherein said illumination means is electrically connected to a parking light.

23. A thermometer as in claim 13, wherein said illumination means includes a lamp located in a passage in said base.

* * * * *